(12) United States Patent
Puech et al.

(10) Patent No.: US 10,009,851 B1
(45) Date of Patent: Jun. 26, 2018

(54) BATTERY CHARGE LEVEL BASED MOBILE NAVIGATION SYSTEM

(71) Applicant: Intel Corporation, Santa Clara, OR (US)

(72) Inventors: Yann Puech, Rabastens (FR); Yan Bertrand, Toulouse (FR); Arnaud Devreese, Leguevin (FR)

(73) Assignee: Intel Corporation, Santa Clara, CA (US)

( * ) Notice: Subject to any disclaimer, the term of this patent is extended or adjusted under 35 U.S.C. 154(b) by 0 days. days.

(21) Appl. No.: 15/391,214

(22) Filed: Dec. 27, 2016

(51) Int. Cl.
*H04M 1/00* (2006.01)
*H04B 1/38* (2015.01)
*H04W 52/02* (2009.01)
*H04W 4/02* (2018.01)

(52) U.S. Cl.
CPC ........... *H04W 52/027* (2013.01); *H04W 4/02* (2013.01); *H04W 52/0216* (2013.01); *H04W 52/0225* (2013.01); *H04W 52/0274* (2013.01); *H04W 52/0296* (2013.01)

(58) Field of Classification Search
CPC ........... H04W 52/027; H04W 52/0216; H04W 52/0225; H04W 52/0274; H04W 52/0296; H04W 4/02; H04W 52/02; H04W 52/0229; H04W 52/028
USPC ........................ 455/404.2, 422.1, 456.1, 574
See application file for complete search history.

(56) References Cited

U.S. PATENT DOCUMENTS

| | | | | |
|---|---|---|---|---|
| 2014/0006137 A1* | 1/2014 | Melen | ............... | G06Q 10/1093 705/14.35 |
| 2014/0163877 A1* | 6/2014 | Kiyama | ............. | G01C 21/3469 701/533 |
| 2015/0308848 A1* | 10/2015 | Inoue | ................. | B60L 11/1838 701/521 |

* cited by examiner

*Primary Examiner* — Nhan Le
(74) *Attorney, Agent, or Firm* — Green, Howard & Mughal LLP

(57) ABSTRACT

An apparatus is provided which comprises: a battery to selectively power the apparatus; a first circuitry to estimate a first travel time to travel from a start location to an end location via a first route; and a second circuitry to (i) determine that a charge of the battery is likely to be exhausted prior to a user is to reach the end location via the first route, if the apparatus is to operate in a first mode of operation, and (ii) display the first route as an infeasible route.

23 Claims, 13 Drawing Sheets

| Route | Estimated time to travel with current traffic | Device type | Estimated battery time (Normal navigation mode) | Estimated battery time (Regular power saving navigation mode) | Estimated battery time (Super power saving navigation mode) | Estimated battery time (Ultimate power saving navigation mode) |
|---|---|---|---|---|---|---|
| Route P (Via ring road Pico) | 1 hr. 10 min | Phone | 1 hr. 9 min | 1 hr. 45 min | 1 hr. 47 min | 2 hrs. 25 min |
| | | Glasses | 1 hr. | 1 hr. 20 min | 1 hr. 35 min | 1 hrs. 35 min |
| Route Q (Via Q1, ..., Q6) | 1 hr | Phone | 50 min | 57 min | 1 hr. 10 min | 1 hr. 15 min |
| | | Glasses | 48 min | 1 hr. 2 min | 1 hr. 10 min | 1 hr. 10 min |
| Route R (Via R1, ..., R16) | 40 min | Phone | 30 min | 32 min | 41 min | 42 min |
| | | Glasses | 25 min | 30 min | 40 min | 40 min |

Select to configure the features you want to turn on/off during navigation, and to re-estimate the battery time Phone battery charge remaining – 10%. Estimated battery time remaining is about 3 hours (e.g., if the navigation system is not used, and this device is operated in the current mode of operation)

Glasses battery charge remaining – 12%. Estimated battery time remaining is about 2 hours 50 minutes (e.g., if the navigation system is not used, and this device is operated in the current mode of operation)

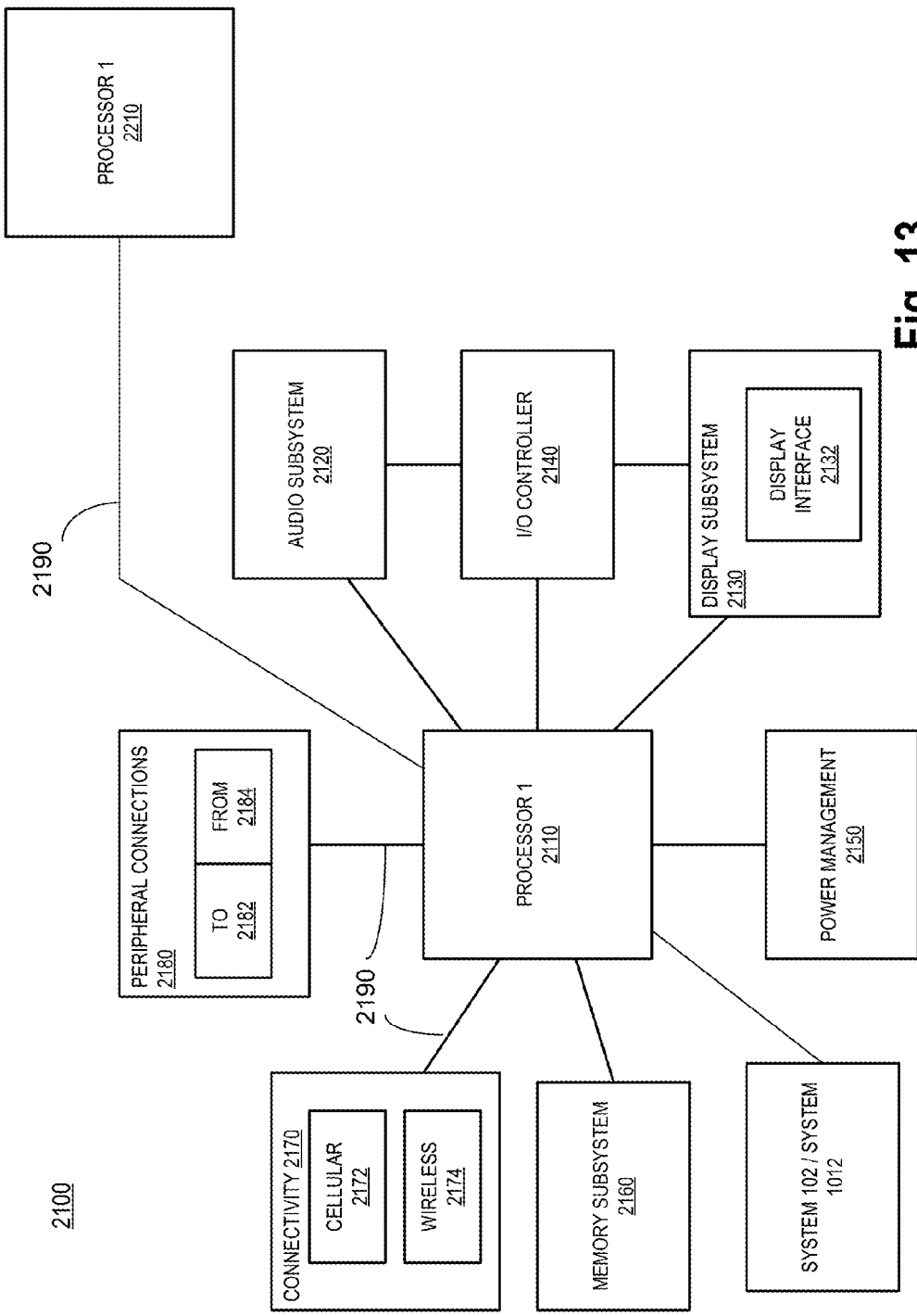

BATTERY CHARGE LEVEL BASED MOBILE NAVIGATION SYSTEM

BACKGROUND

With advancement of smart phones and mobile phones, these phones are often used for navigational purposes. For example, a smart phone can include global navigation satellite system (GNSS) sensors (e.g., global positioning system (GPS) sensors) that can relatively precisely detect a geo-location of the smart phone. In some examples, the smart phone can provide navigational directions to a user of the smart phone, while the user drives to a destination. Often times, when the user is driving to a destination using navigational directions provided by a smart phone, a battery charge of the smart phone can be exhausted before reaching the destination, which can be inconvenient to the user.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 11 illustrates a user interface window displaying estimated battery time remaining in a first device and a second device, for each of a plurality of navigation modes, according to some embodiments.

FIG. 13 illustrates a computing device, a smart device, a computing device or a computer system or a SoC (System-on-Chip), which is used to provide battery power efficient navigation services.

DETAILED DESCRIPTION

Figure 1:
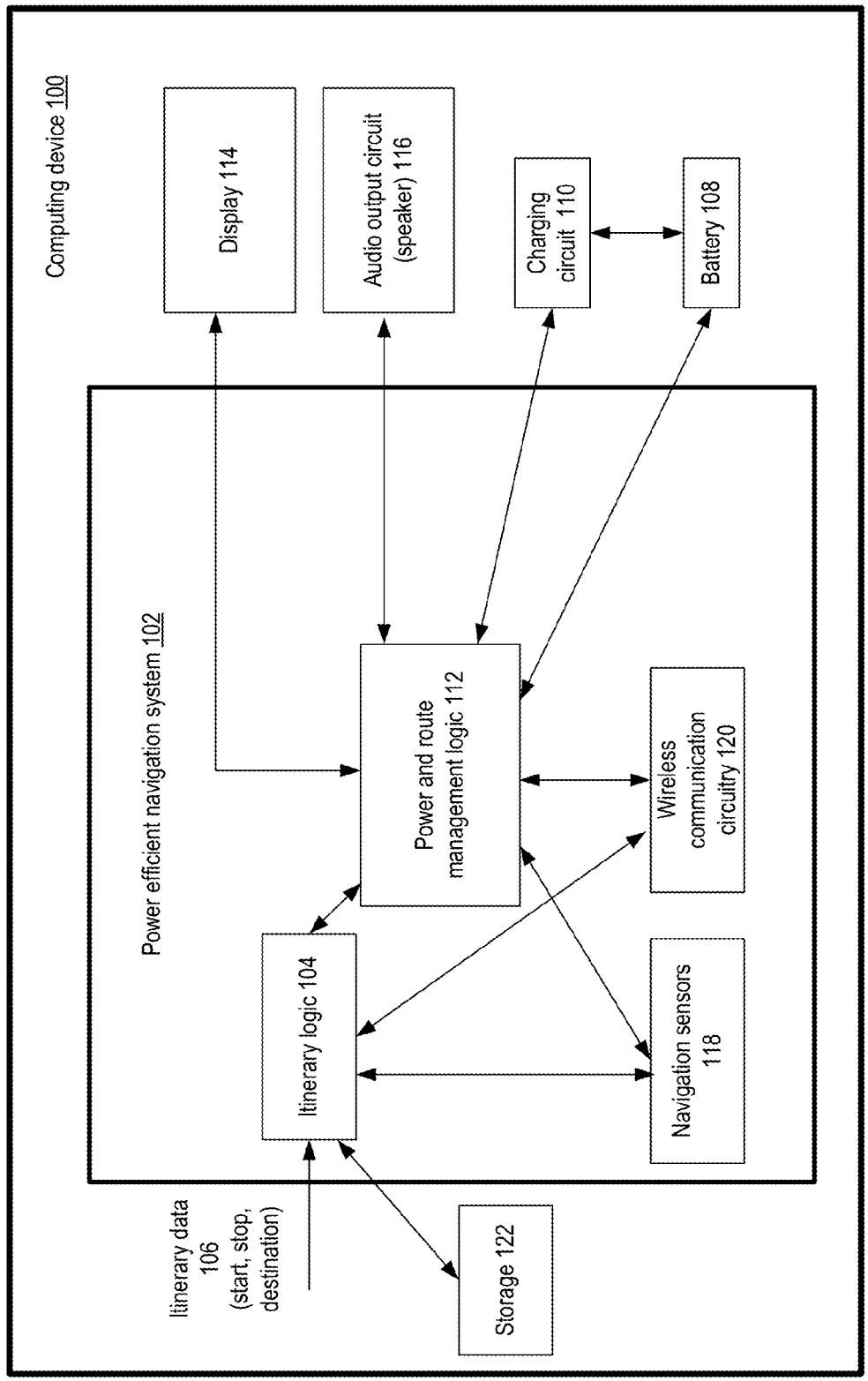
FIG. 1 schematically illustrates a power efficient navigation system included in a computing device, where the power efficient navigation system takes into account a battery charge level of the computing device while providing navigational services to a user of the computing device, according to some embodiments.

A computing device, such as a mobile phone, often includes navigation sensors, using which the computing device can estimate its geo-location. The computing device can also provide navigational directions to a user traveling from a starting location to a destination. In some embodiments, the navigational directions can be output by the computing device. In addition to, or instead of the computing device, in some embodiments, navigational directions can also be output by an auxiliary device (e.g., a smart wearable pair of glasses, a smart watch, a device that projects the navigational directions on the front windshield of a car, etc.). In some examples, when the user is driving to a destination using navigational directions provided by a smart phone and/or an associated auxiliary device, a battery of the smart phone and/or the auxiliary device can be exhausted before reaching the destination, which can be inconvenient to the user.

To solve this issue, in some embodiments, while generating possible routes for travelling from a starting location to a destination, a computing device takes into account a battery level of the computing device and/or a battery level of the auxiliary device. If it is determined that the travel time to a destination is more than an estimated remaining battery time of the computing device and/or the auxiliary device, the computing device can issue a warning, e.g., to warn the user that the route may not be feasible.

In an example, the computing device may offer an alternate feasible route (e.g., that can be travelled before the battery gets exhausted). Additionally or alternatively, the computing device can also propose various power saving navigation modes to save battery power, such that the battery of the computing device and/or the auxiliary lasts until the user reaches the destination.

There are many technical effects of the various embodiments. For example, if the user receives an advance warning about possible exhaustion of battery power, the user can charge the battery before leaving, carry a car-charger while travelling, carry a portable battery charge pack to charge the battery, be mentally prepared for the battery power to be exhausted before reaching the destination, and/or the like. Furthermore, in addition to providing warnings about possible battery power exhaustion, the computing device can also provide the user with viable alternatives, e.g., alternate routes, operating the computing device and/or the auxiliary device in a power saving navigation mode, and/or the like, to enable the user to possibly reach the destination with available battery power.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on." The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C). The terms "left," "right," "front," "back," "top," "bottom," "over," "under," and the like in the description and in the claims, if any, are used for descriptive purposes and not necessarily for describing permanent relative positions.

FIG. 1 schematically illustrates a power efficient navigation system 102 (henceforth also referred to as "system 102") included in a computing device 100 (henceforth also referred to as "device 100"), where the system 102 takes into account a battery charge level of the device 100 while providing navigational services to a user of the device 100, according to some embodiments. The device 100 can be any appropriate device providing navigational guidance, e.g., a smart phone, a cell phone, a mobile phone, a wearable device, an Internet-of-things (TOT), a GNSS device capable of providing directions (e.g., such as a GPS device), a laptop, a tablet, etc.

In some embodiments, the system 102 includes an itinerary logic 104 (henceforth also referred to as "logic 104") configured to receive itinerary data 106. Logic (e.g., the logic 104), as referred to in this disclosure, can be implemented using, for example, a combination of hardware components (e.g., circuitry) and software components. In another example, logic can be implemented using solely hardware components, or using solely software components.

The itinerary data 106, for example, is received from a user via an appropriate input interface of the device 100, or from another appropriate source. The itinerary data 106, for example, comprises a start point of an itinerary, a destination or an end point of the itinerary, one or more stops in the itinerary, and/or the like.

In some embodiments, the logic 104 is configured to access a storage 122. The storage 122 can be any appropriate type of memory storing a database of maps, among other contents. In some embodiments, the database of the maps in the storage 122 can be updated periodically or intermittently.

In some embodiments, the logic 104 is configured to access the database of the maps from the storage 122. In some embodiments, additionally or alternatively, the logic 104 can also access another database of maps from a remote server (e.g., a cloud based server, not illustrated in FIG. 1, using wireless communication circuitry 120 of the device 100) over a network (e.g., the Internet, not illustrated in FIG. 1).

In some embodiments, the system 102 comprises navigation sensors 118 and/or wireless communication circuitry 120 (henceforth referred to as "circuitry 120"). The navigation sensors 118, for example, can determine a geo-location of the device 100 using, for example, GNSS signals (e.g., GPS signals) received from one or more satellites. Although the navigation sensors 118 are illustrated to be included in the device 100, in some other embodiments, the navigation sensors 118 can be external to the device 100.

In some embodiments, the circuitry 120 includes, for example, antennas, receivers, baseband processors, filters, and/or the like, used by the device 100 to wirelessly communicate with another device (e.g., with a base station, an access point, etc.) using any appropriate wireless communication protocol.

In some embodiments, the logic 104 can determine a geo-location of the device 100, for example, using signals received by the navigation sensors 118 and/or signals received by the circuitry 120. For example, the circuitry 120 can provide a coarse location of the device 100, while the navigation sensors 118 can provide a relatively more accurate location of the device 100.

In some embodiments, the logic 104 can determine one or more routes to travel from a starting point to a destination point, for example, based on the itinerary data 106, the maps accessed from the storage 122 and/or the maps accessed from the remote server, and the location of the device 100 determined using the navigation sensors 118 and/or the circuitry 120.

In some embodiments, the device 100 further comprises a battery 108, and a charging circuitry 110 (henceforth also referred as to "circuitry 110") to charge the battery 108. The circuitry 110, for example, receives direct current (DC) from an alternating current (AC) to DC converter, using which the battery 108 is charged. In another example, the circuitry 110 receives power from another appropriate source, e.g., a universal series bus (USB) connection, for charging the battery 108. In some embodiments, the device 100 operates using power received from the charger 110 and/or power received from the battery 108.

In some embodiments, the device 100 further comprises a display 114 and an audio output circuitry 116. In some embodiments, the audio output circuitry 116 comprises one or more speakers, and hence, the audio output circuitry 116 is also referred to herein as speaker 116. Merely as an example, the display 114 and/or the speaker 116 are used to output navigational directions, although these components can be used to output any other appropriate video and/or audio contents.

In some embodiments, a power and route management logic 112 (henceforth also referred to as "logic 112") receives information from the circuitry 110 and/or the battery 108, based on which the logic 112 can estimate a remaining charge level of the battery 108. In some embodiments, the logic 108 is also configured to estimate a remaining battery time (also referred to as "estimated battery time") if the device 100 operates in the current mode of operation, and/or if the device 100 operates in one or more of a plurality of navigation modes of operation, as will be discussed in more detail herein later.

In some embodiments, the device 100 includes many other components, although these components are not illustrated in FIG. 1 for illustrative clarity and to not obfuscate the teachings of this disclosure. For example, the device 100 comprises a display controller for controlling the display 114, an audio decoder for decoding audio signals to the speaker 116 and for controlling the speaker 116, a processor (which, for example, can implement at least a part of the logic 104 and/or the logic 112), buses, peripheral devices, and/or the like, although these are not illustrated in the figure.

Figure 2:
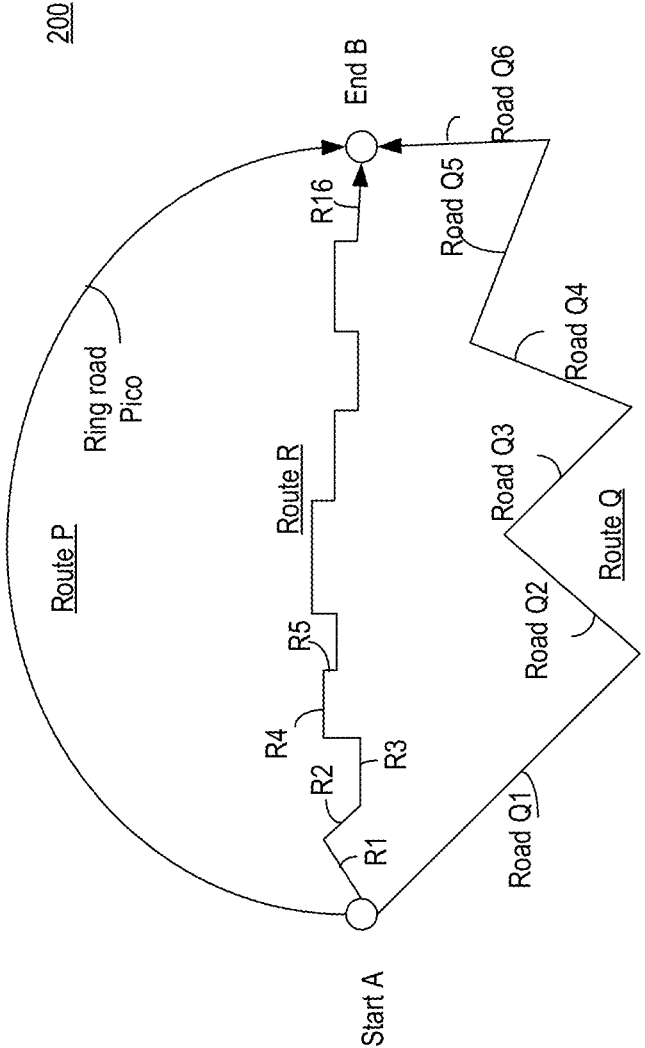
FIG. 2 schematically illustrates a map depicting various routes to reach an end point B from a start point A, according to some embodiments.

FIG. 2 schematically illustrates a map 200 depicting various routes calculated by the logic 104 to reach an end point B from a start point A, according to some embodiments. The map 200 is merely a simplified example to illustrate the teachings of this disclosure, and an actual map displayed by the device 100 is most likely to be more complex and detailed (e.g., is likely to illustrate various roads, points of interest, etc.).

Three routes P, Q, and R are illustrated in the map 200. The map 200, for example, is displayed on the display 114 by the logic 112, e.g., in response to an itinerary data 106 inputting the start point A and the end point B and the logic 104 identifying the routes P, Q, and R.

The route P, for example, comprises a single road ("Ring road Pico") to reach from point A to point B. The route Q comprises roads Q1, . . . , Q6 to reach from point A to point B. The route R comprises roads R1, . . . , R16 to reach from point A to point B.

Merely as an example, in FIG. 2, the route P has minimum number of turns. For example, once a user is in the ring road Pico, the user drives without taking any turns, to reach the end point B. The route Q has about 5 turns (e.g., from road Q1 to Q2, from road Q2 to Q3, and so on). The route R has about 16 turns.

Figure 3:
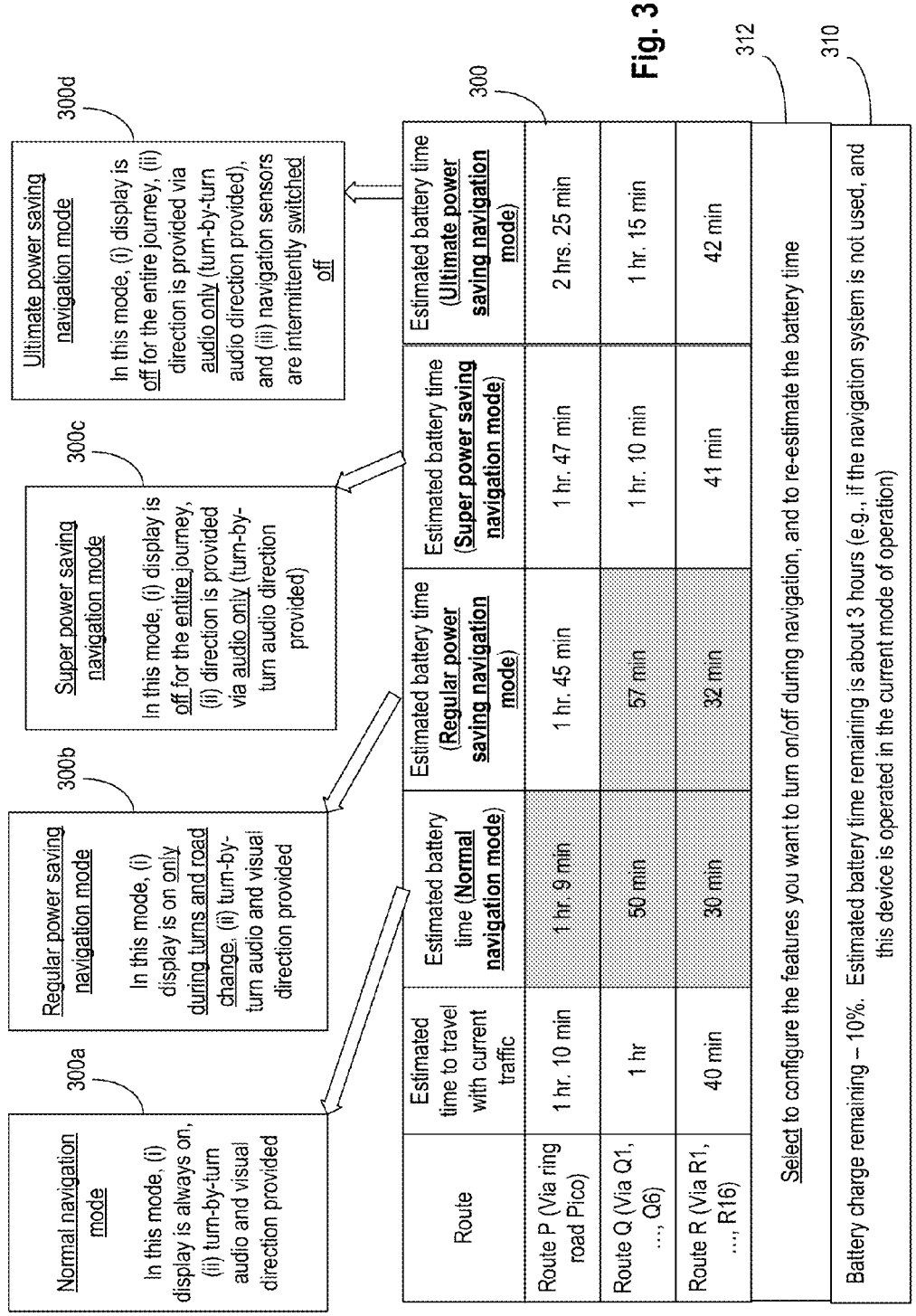
FIG. 3 illustrates a user interface window displaying an estimated battery time remaining for each of a plurality of navigation modes, according to some embodiments.

FIG. 3 illustrates a user interface window 300 (henceforth also referred to as "window 300") displaying estimated battery time remaining for each of a plurality of navigation modes, according to some embodiments. In some embodiments, the window 300 is displayed on the display 114, e.g., by the logic 112. In some embodiments, the window 300 can be displayed along with the map 200. In some other embodiments, the window 300 is displayed based on a user selecting an option in the map 200 (where the option is not illustrated in the map 200 in FIG. 2).

The window 300 identifies various routes (e.g., routes P, Q, and R), and can also briefly describe the routes (e.g., describes the route P to be via the ring road Pico, describes the route Q to be via the roads Q1, . . . , Q6, and so on). The window 300 further illustrates the corresponding estimated time it would take to reach the end point B via various routes. For example, in the example of FIG. 2, the window 300 displays that the estimated time to reach the point B via route P is 1 hour, 10 minutes; the estimated time to reach the point B via route Q is 1 hour; and the estimated time to reach the point B via route R is 40 minutes. Thus, the route R is the quickest route and the route P is the route that takes most time. Although not illustrated in FIG. 2, in some embodiments, the window 300 can also illustrate a distance to be covered to reach the point B via each of the routes P, Q, and R.

In some embodiments, the estimated time taken to reach the destination via a route can take into account the current traffic condition. This, for example, is applicable if the device 100 receives real-time or near real-time traffic updates (e.g., using the circuitry 120 or by some other means). The travel time is estimated with the current traffic condition accounted for.

Merely as an example, it is assumed that while the window 300 is being displayed, the circuitry 110 is off, and the battery 108 is not being charged. Accordingly, it is assumed that while the window 300 is being displayed, the device 100 is powered solely by the battery 108 (and not by any external power source).

In some embodiments, the window 300 also illustrate identification of a plurality of navigation modes, e.g., a normal navigation mode, a regular power saving navigation mode, a super power saving navigation mode, and an ultimate power saving navigation mode. In some embodiments, a user selecting (e.g., by clicking, tapping, hovering over, or otherwise selecting) a navigation mode pops up another user interface window that briefly explains the corresponding mode.

For example, a user selecting the normal navigation mode results in a user interface window 300a popping up on the display 114. The window 300a, for example, explains that while the device 100 operates in the normal navigation mode, the display 114 is on during the entire time the user drives from point A to point B. Also, in this navigation mode, turn-by-turn audio and visual directions are respectively provided by the speakers 116 and the display 114. In some embodiments, while the device 100 operates in the normal navigation mode and while the user of the device 100 drives from point A to point B, the navigation sensors 118 and the circuitry 120 can remain on (e.g., unless switched off specifically by the user of the device 100).

In some embodiments, because there are lots of turns in the route R, if the route R is to be taken by the user, the speakers 116 are to be active often to announce the turns, which can drain the battery relatively quickly. On the other hand, if the route P is taken, there is virtually no turns in this route. So, once the system 100 guides the user to the ring road Pico, the speakers 116 are not activated until the user reaches the point B. Accordingly, if the route P is to be taken to drive from point A to point B, the battery can be consumed relatively slowly (e.g., compared to the consumption while driving via the route R). Similarly, if the route Q is taken to drive from point A to point B, the battery is consumed slower than the route R but faster than the route P. Accordingly, the estimated battery time left for the normal navigation mode is 30 minutes for the route R; 50 minutes of the route Q; and 1 hour, 9 minutes for the route P (note that these numbers are merely examples for explaining the principles of this disclosure).

The window 300 also illustrates, for example, a regular power saving navigation mode. Selecting this option pops up the user interface window 300b providing a brief description of this mode. For example, in the regular power saving navigation mode, the display 114 is intermittently turned off (e.g., while there are no turns or road changes soon). For example, as illustrated in the window 300b, the display 114 is turned on during turns and road changes. Furthermore, the system 102 provides audio and visual directions (e.g., via the speakers 116 and the display 114, respectively) during turns and road changes in this mode.

In some embodiments, because of the savings in battery power consumption while operating in the regular power saving navigation mode (e.g., due to intermittent off mode of the display 114), the battery 108 usually may last longer in the regular power saving navigation mode than the normal navigation mode, e.g., for a given route. For example, the estimated battery time remaining for the routes P, Q, and R are 1 hour 45 minutes, 57 minutes, and 32 minutes, respectively, if the device 100 is to operate in the regular power saving navigation mode while driving from point A to point B.

It is to be noted that, for example, if the route P is taken, there are no turns or road changes in this route. So, the display is off almost the entire duration of the drive from point A to point B for route P. Accordingly, the battery is estimated to last much longer for route P while operating in the regular power saving navigation mode than the normal navigation mode. In contrast, because the route R has numerous turns, the display 114 is almost always on for this route even in the regular power saving navigation mode, and hence, the potential power saving over the normal navigation mode is not significant or this route.

In some embodiments, the window 300 also illustrates, for example, a super power saving navigation mode. Selecting this option pops up the user interface window 300c providing a brief description of this mode. For example, in the super power saving navigation mode, the display 114 is turned off for the entire journey from point A to point B, and the system 102 provides audio directions (e.g., only audio directions), e.g., via the speakers 116, in this mode. In an example, because the display 114 is turned off, the audio directions can be repeated more often and/or more precisely.

Although not illustrated in FIG. 3, in another embodiment, in the super power saving navigation mode, the role of the audio and visual directions can be interchanged—e.g., the audio direction can be turned off entirely, and the display during the turns can be turned on instead (for example, if a co-passenger is viewing the directions and instructing the driver accordingly). Whether the audio is turned off or the display is turned off (e.g., whether visual only directions or audio only directions are provided) can be, for example, a user configurable parameter, as discussed herein later.

In some embodiments, because of the savings in battery power consumption while operating in the super power saving navigation mode, the battery 108 usually may last longer in the super power saving navigation mode than the normal navigation mode and the regular power saving navigation mode, e.g., for a given route. For example, the estimated battery time remaining for the routes P, Q, and R are 1 hour 47 minutes, 1 hour, 10 minutes, and 41 minutes, respectively, for the super power saving navigation mode.

In some embodiments, the window 300 also illustrates, for example, an ultimate power saving navigation mode. Selecting this option pops up the user interface window 300d providing a brief description of this mode. For example, in the ultimate power saving navigation mode, the display 114 is turned off for the entire journey from point A to point B (although, instead, the audio can also be turned off), the navigational sensors 118 are intermittently switched off, and the system 102 provides only audio directions (e.g., via the speakers 116) in this mode. For example, for the route P, as the user enters the ring road Pico to drive from point A to point B, the system 102 is aware that for about the next 1 hour or so, there would be no turns or road changes. So, the system 102 turns off the navigational sensors 118 (e.g., the navigational sensors 118 enter a sleep or low power mode) for about 50 minutes, and assumes that the user is following the route P. After about 50 minutes, the navigational sensors 118 are turned on by the logic 112, and the navigational sensors 118 continues guiding the user to the end point B.

In some embodiments, during this time (e.g., while the navigational sensors 118 are in the sleep mode), the circuitry 120 can be still switched on, thereby providing a coarse geo-location of the device 100 to the system 102 (e.g., based on the circuitry 120 communicating with three or more base stations, and estimating an approximate location of the device 100 based on such communication). Based on the approximate location provided by the circuitry 120, if the device 100 finds itself diverting from the route P (e.g., due to the user making a wrong turn), then the device 100 can immediately switch on the navigational sensors 118 to estimate a more precise location of the device 100 and guide the user back to the correct route.

In some embodiments, because of the savings in battery power consumption while operating in the ultimate power saving navigation mode, the battery 108 usually will last longer in the ultimate power saving navigation mode than the normal navigation mode, the regular power saving navigation mode and/or the super power saving navigation mode, e.g., for a given route. For example, the estimated battery time remaining for the routes P, Q, and R are about 2 hour 25 minutes, 1 hour 15 minutes, and 42 minutes, respectively, for the ultimate power saving navigation mode.

Some of the combination of the route/navigation mode in the window 300 are achievable using the remaining battery power, while some are not. The feasible combinations in FIG. 3 are not highlighted, while the infeasible options are shaded (e.g., using light gray color). Merely as an example, for the route Q, the normal navigation mode and the regular power saving navigation mode cannot be completed with the remaining battery power (e.g., these modes are infeasible for this route, and hence, are shaded), while the super and ultimate navigation modes are estimated to be feasible with the remaining battery power (and hence, are not shaded). The shading in FIG. 3 indicates that the system 102 is issuing some kind of warning to a user of the device 100, warning that the associated routes for the associated navigation modes may be infeasible, e.g., may not be completed with the remaining battery power.

Driving in an unknown city, for example, with the ultimate power saving navigation mode or the super power saving navigation mode can be uncomfortable for a user, e.g., due to a general unfamiliarity with the area (e.g., because there is a higher chance of getting lost and/or get off-route with these modes than the regular power saving navigation mode, as these modes do not provide visual directions and/or the navigation sensors can be switched off intermittently). So, in such a case, the user may select, merely as an example, the route P with the regular power saving navigation mode that has the estimated travel time of 1 hour 10 minutes (e.g., instead of selecting the route R with the super power saving navigation mode and a travel time of 41 minutes).

In another example, the user can be somewhat familiar with the area, and can be comfortable driving with the ultimate power saving navigation mode or the super power saving navigation mode. In such a case, the user may select, merely as an example, the route R with the super power saving navigation mode that has the estimated travel time of 41 minutes (e.g., instead of selecting the route P with the regular power saving navigation mode).

In some embodiments, selecting a combination of a route and a navigation mode actives the navigation mode and guides the user to drive via the selected route. For example, if the user selects the route Q with the super power saving navigation mode, this navigation mode is activated and the route Q is selected for guiding the user of the device 100 to drive from point A to point B.

In some embodiments, the window 300 can also display, for example, an option (illustrated using label 312) to configure individual features and generate a customized power saving navigation mode. For example, selecting this option can present the user with options to individually switch off the display for the entire travel from point A to point B, switch off the display only when there are no turns, selectively turn off the navigation sensors 118 (e.g., when there are no turns), selectively turn off the circuitry 120 (e.g., when there are no turns), turn off one or more other applications of the device, reduce a brightness of the display, reduce an audio output level of the speaker, and/or the like.

In some embodiments, the window 300 can also, for example, display (e.g., illustrated using label 310 in FIG. 3) a remaining percentage of battery charge, and estimated battery time remaining if the navigation system 102 is not used and the device 100 operates in a current mode of operation.

FIG. 3 illustrates four example navigation modes. It should be understood that these navigation modes are merely examples, and more (or less) than four navigation modes can also be displayed. Also, the power saving techniques corresponding to each navigation mode are merely examples, and one or more additional power saving techniques can also be used. Merely as an example, some of the additional power saving techniques may involve one or more of reducing a brightness or the display 114, switching off one or more applications currently running on the device 100, switching off a Wi-Fi connection, a Near-field communication (NFC) connection and/or a Bluetooth® connection of the device 100, reducing a volume of the audio output of the speaker 116, and/or the like. The manner in which the information is presented in the window 300 is merely an example, and the information (or at least a part of the information) can be presented in a user interface window using any other appropriate format.

Figure 4:
FIG. 4 illustrates another user interface window displaying an estimated battery time remaining for each of a plurality of navigation modes, according to some embodiments.

In FIG. 3, all combination of the routes and the navigation modes are estimated and displayed in the window 300. However, in some embodiments, for a given route, if a feasible navigation mode is estimated, another navigation mode with higher power savings may not be estimated and/or displayed. For example, FIG. 4 illustrates a user interface window 400 (henceforth also referred to as "window 400") displaying estimated battery time remaining for each of a plurality of navigation modes, according to some embodiments. The parameters used in the window 400 is similar to those in the window 300. However, unlike the window 300, in the case of window 400 the battery time for all the combinations of routes and navigation modes are not estimated and/or displayed.

For example, referring to FIG. 4, the logic 112 estimates that for the route P, the regular power saving navigation mode is feasible (e.g., the estimated remaining battery time of 1 hour, 45 minutes is sufficient to reach the destination via this route). Accordingly, in some embodiments, the logic 112 refrains from estimating and/or displaying the remaining battery time for this route for the super and ultimate power saving navigation modes (e.g., as these would be unnecessary, as the regular power saving navigation mode is sufficient to guide the user to the point B via this route).

Figure 5:
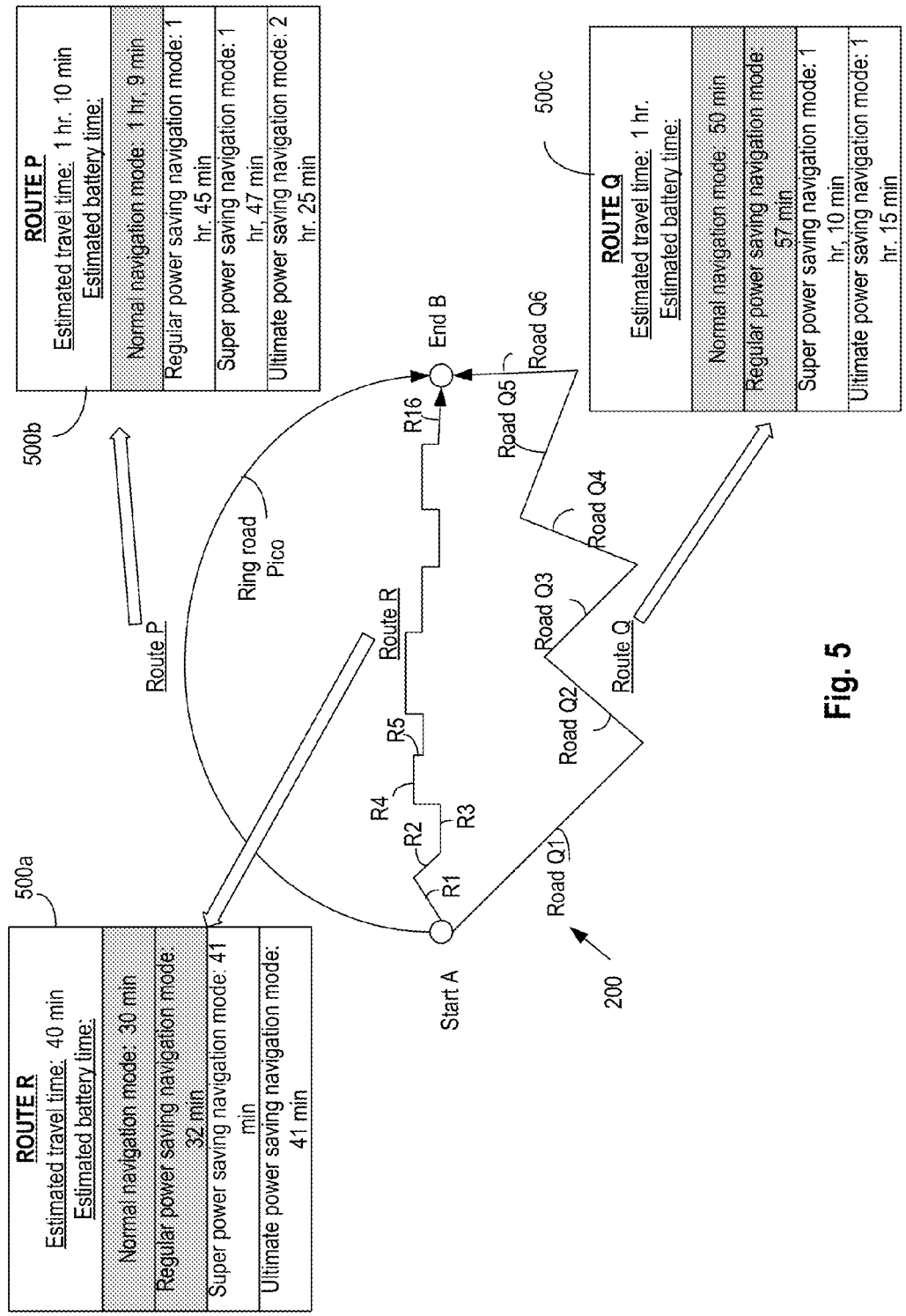
FIG. 5 illustrates a map along with one or more user interface windows displaying estimated battery time remaining for each of a plurality of navigation modes, according to some embodiments.

FIG. 3 illustrates the various remaining battery time in the particular format of the window 300. However, similar information can be delivered to the user of the device 100 in any other appropriate manners. For example, FIG. 5 illustrates a map (e.g., the map 200 of FIG. 2) along with one or more user interface windows (e.g., user interface windows 500*a*, 500*b*, and/or 500*c*) displaying estimated battery time remaining for each of a plurality of navigation modes, according to some embodiments.

In an example, the windows 500*a*, 500*b*, and 500*c* are displayed, e.g., when the map 200 is displayed. In another example, individual ones of these windows (e.g., the window 500*b*) is displayed based on a user selecting a corresponding route (e.g., the route P). In yet another example, the windows 500*a*, 500*b*, and/or 500*c* are displayed based on a user selecting an option in the map 200 or in a set-up menu (not illustrated in the figures) to display travel time and remaining battery based on various navigation modes. The windows 500*a*, 500*b*, and 500*c* will be evident to those skilled in the art, based at least in part on the discussion with respect to the window 300 of FIG. 3, and hence, these windows will not be discussed in further detail herein.

Figure 6:
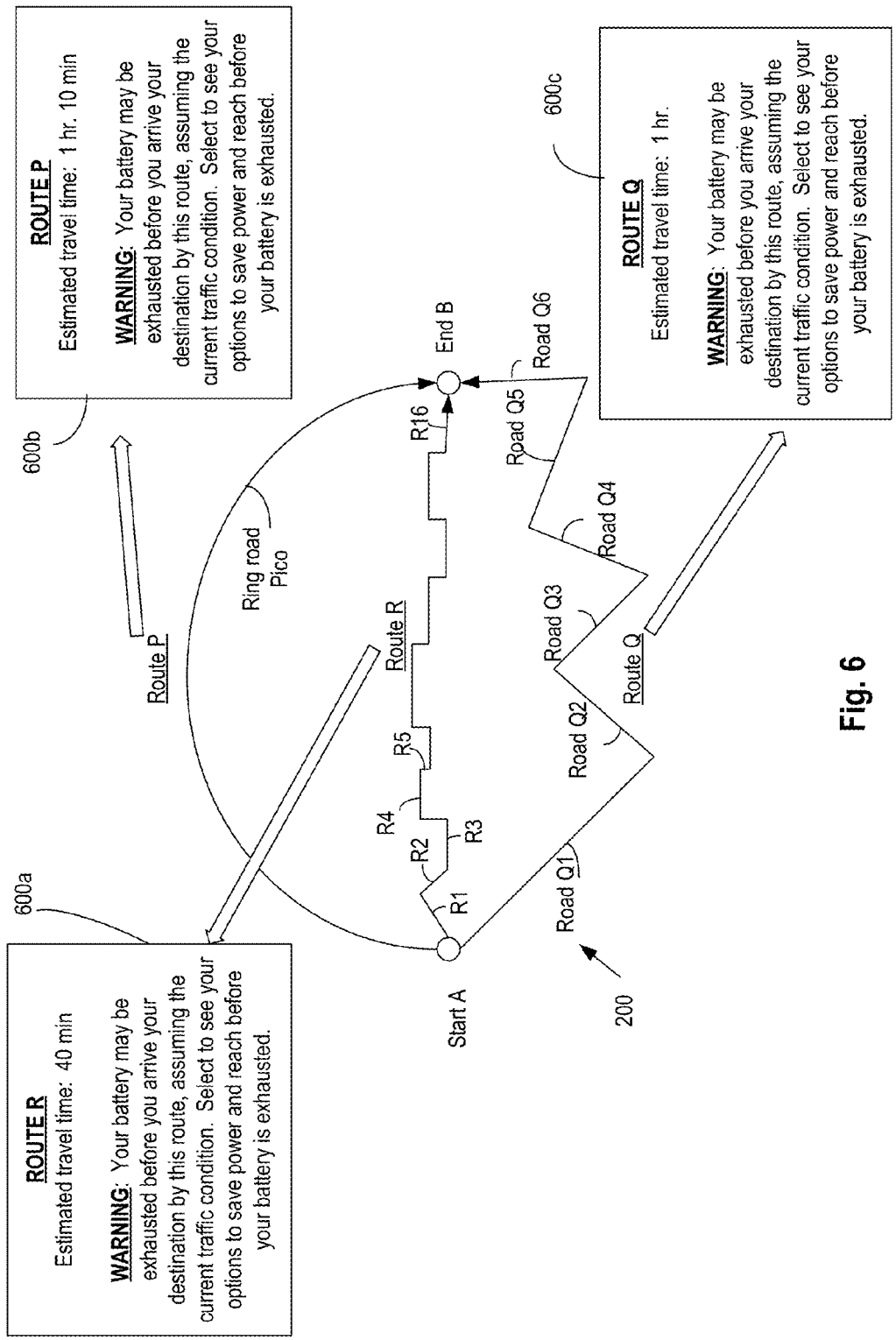
FIG. 6 illustrates a map along with one or more warnings about battery charge being exhausted prior to reaching a destination, according to some embodiments.

FIG. 6 illustrates a map (e.g., the map 200 of FIG. 2) along with one or more warnings about battery charge being exhausted prior to reaching the destination, according to some embodiments. For example, as illustrated in FIG. 3, none of the routes P, Q, and R are feasible under the normal navigation mode (which, for example, can be the default navigation mode set by the user, or set by default). Accordingly, warnings 600*a*, 600*b*, and/or 600*c* may be overlaid on the map 200.

In an example, the warnings 600*a*, 600*b*, and 600*c* are displayed, e.g., when the map 200 is displayed. In another example, individual ones of these warnings (e.g., the warning 600*b*) is displayed based on a user selecting a corresponding route (e.g., the route P). In yet another example, the warnings 600*a*, 600*b*, and/or 600*c* are displayed based on a user selecting an option in the map 200 or in a set-up menu (not illustrated in the figures) to display travel time and remaining battery based on various navigation modes. Selecting a warning (e.g., the warning 600*a*) can, for example, display one of the window 500*a*, 400, or 300 of FIG. 5, 4, or 3, respectively.

Figure 7:
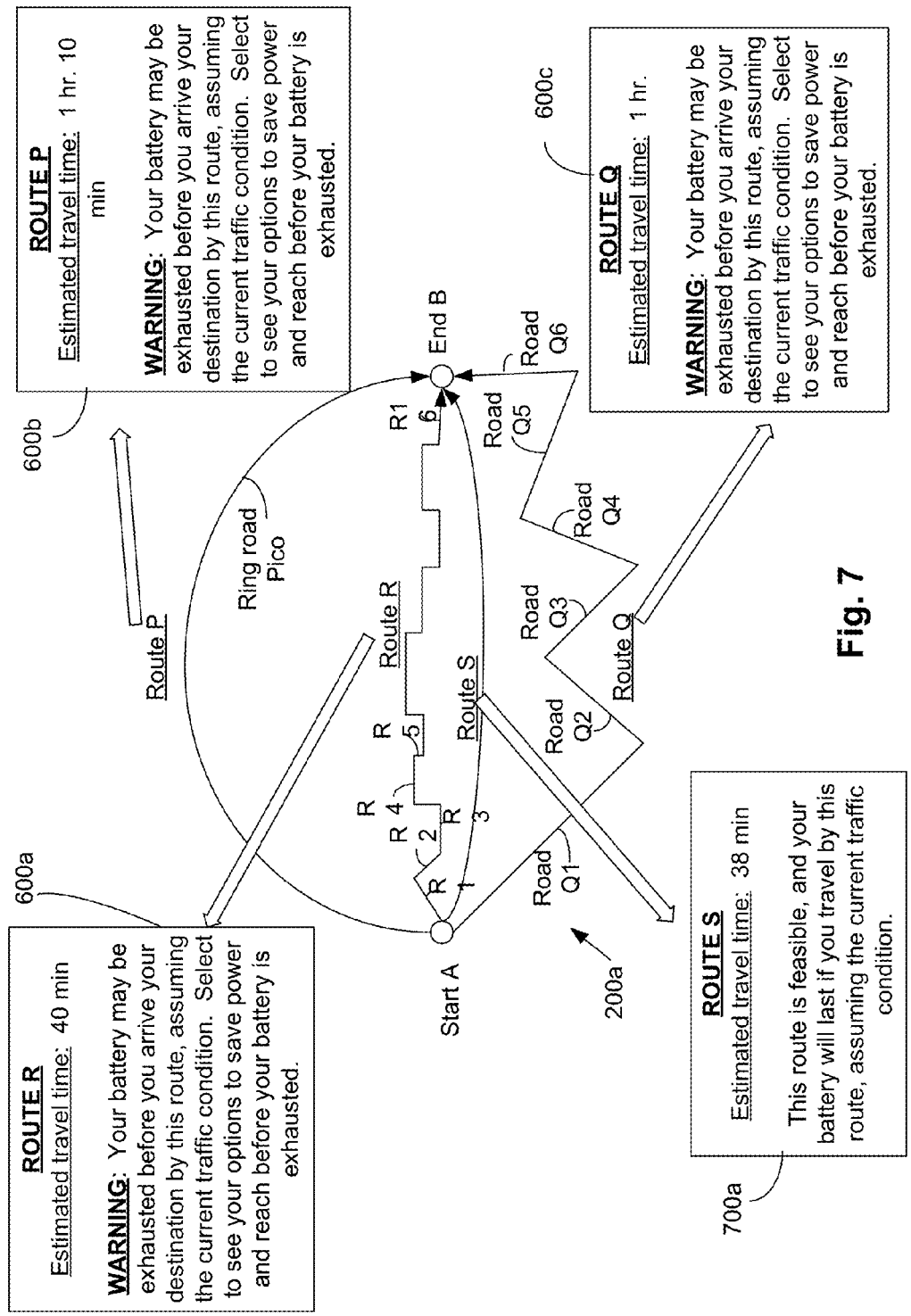
FIG. 7 illustrates another map along with one or more warnings about battery charge being exhausted prior to reaching the destination, according to some embodiments.

FIG. 7 illustrates a map (e.g., a map 200*a*) along with one or more warnings about the battery charge being exhausted prior to reaching the destination, according to some embodiments. The map 200*a* is similar to the map 200 of FIG. 2, but has an additional route S, e.g., in addition to the routes P, Q, and R of the map 200. Assume that the user can reach the destination point B via the route S, e.g., while being in the normal navigation mode. Accordingly, the map 200*a* continues to display the warmings 600*a*, 600*b* and/or 600*c* of FIG. 6. Also, the map 200*a* displays a user interface window 700*a* indicating that the route S is feasible, and the battery will last (e.g., assuming that the device operates in the normal navigation mode) if this route is selected, e.g., taking in account the current traffic conditions.

Figure 8:
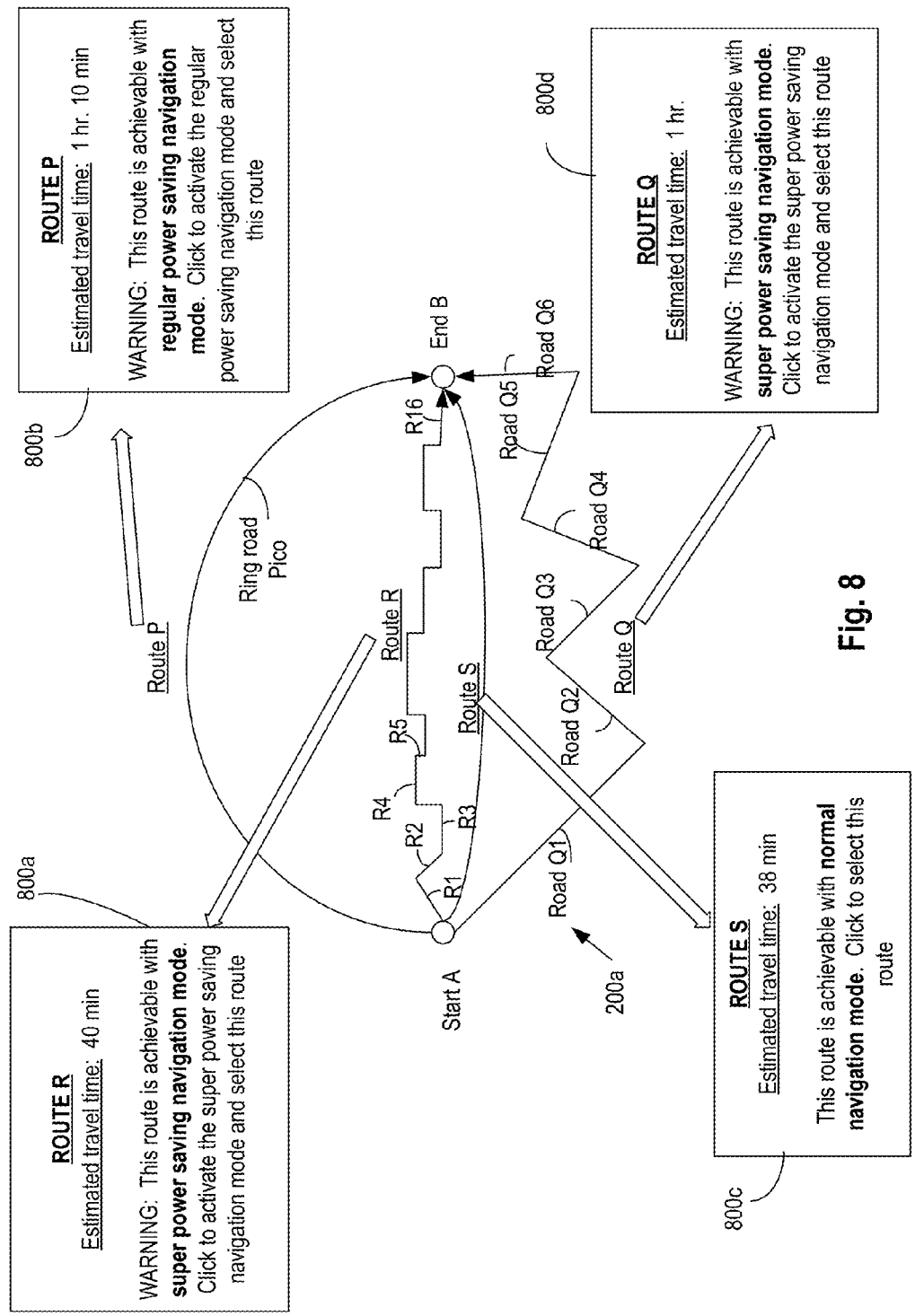
FIG. 8 illustrates a map along with an indication about a feasible navigation mode for a route, if any, according to some embodiments.

The warnings and indications in a map can be displayed in various other appropriate manners as well. Merely as an example, FIG. 8 illustrates a map (e.g., the map 200*a*) along with an indication about a feasible navigation mode for a route, if any, according to some embodiments. For example, the map 200*a* in FIG. 8 identifies the most convenient (e.g., having least power saving features) and feasible navigation mode for each route (if any) via the user interface windows 800a, . . . , 800d. For example, the route P is feasible with the regular, super, and ultimate power saving navigation modes, as discussed with respect to FIG. 3, among which the regular power saving navigation mode may be most convenient to the user (e.g., has least power saving techniques). Accordingly, in FIG. 8, the window 800b identifies the regular power saving navigation mode. The windows 800a, . . . , 800d will be readily evident to those skilled in the art, e.g., based at least in part on discussions with respect to FIGS. 3-7, and hence, these windows will not be discussed in further detail herein.

Figure 9:
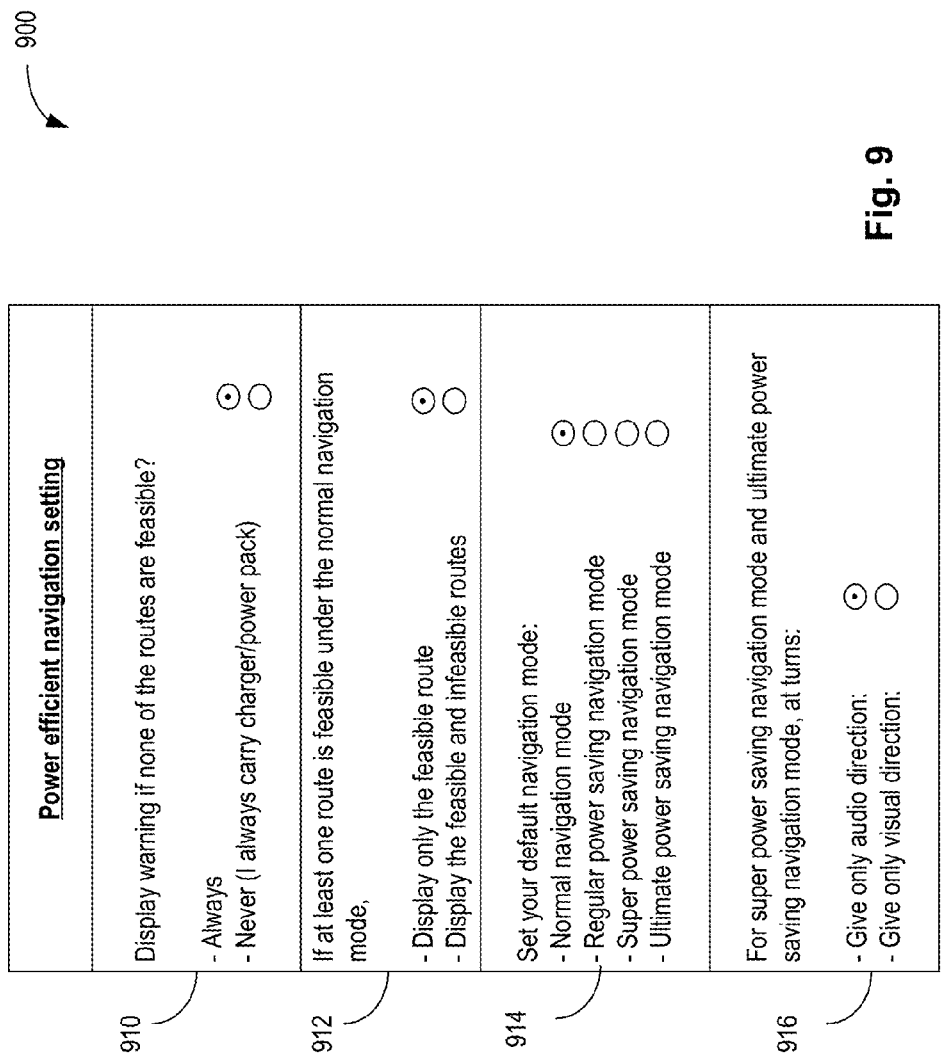
FIG. 9 illustrates example power efficient navigation configuration settings to configure a power efficient navigation system, according to some embodiments.

In some embodiments, the user can configure the system 102. FIG. 9 illustrates example power efficient navigation configuration settings 900 to configure the system 102 of FIG. 1, according to some embodiments. The settings 900, for example, are displayed on the display 114, and allow the user of the device 100 to select one or more options in the settings 900 and configure the system 102.

In some embodiments, the settings 900 comprise a setting 910 that allows a user to configure to whether to display a warning if none of the routes calculated by the logic 104 is feasible. Selecting the option "Never," for example, does not display any warning even if none of the routes is feasible. Selecting "Yes," for example, displays one or more warning, e.g., as discussed with respect to FIGS. 3-8.

In some embodiments, the settings 900 further comprise a setting 912 that dictates that if at least one route is feasible under the normal navigation mode, whether only the feasible route(s) is to be displayed, or whether both feasible and infeasible routes are to be displayed. This setting, if set, may act as a filter to filter out infeasible routes from being displayed. Of course, for example, in none of the routes are feasible under the normal navigation mode, the infeasible routes are displayed, with options for various power saving navigation modes, e.g., as discussed with respect to FIGS. 3-8.

In some embodiments, the settings 900 further comprises a setting 914 that allows the user to set a default navigation mode, e.g., select one of the normal navigation mode, the regular power saving navigation mode, the super power saving navigation mode, and the ultimate power saving navigation mode as the default navigation mode.

In some embodiments, the settings 900 further comprises a setting 916 that allows the user to set a default option, e.g., either audio only directions at turns or display only directions at turns, for the super and ultimate power saving navigation modes. For example, selecting the audio only option results in the display of windows 300c and 300d of FIG. 3. However, if the display only option is selected, the windows 300c and 300d are modified to reflect that directions are provided via display only (e.g., turn-by-turn directions are only displayed in the display 114, but not audible in the speakers 116).

Although FIG. 9 illustrated some example settings, many other settings for the power efficient navigation can be envisioned by those skilled in the art, e.g., based at least in part on the teachings of this disclosure.

Figure 10:
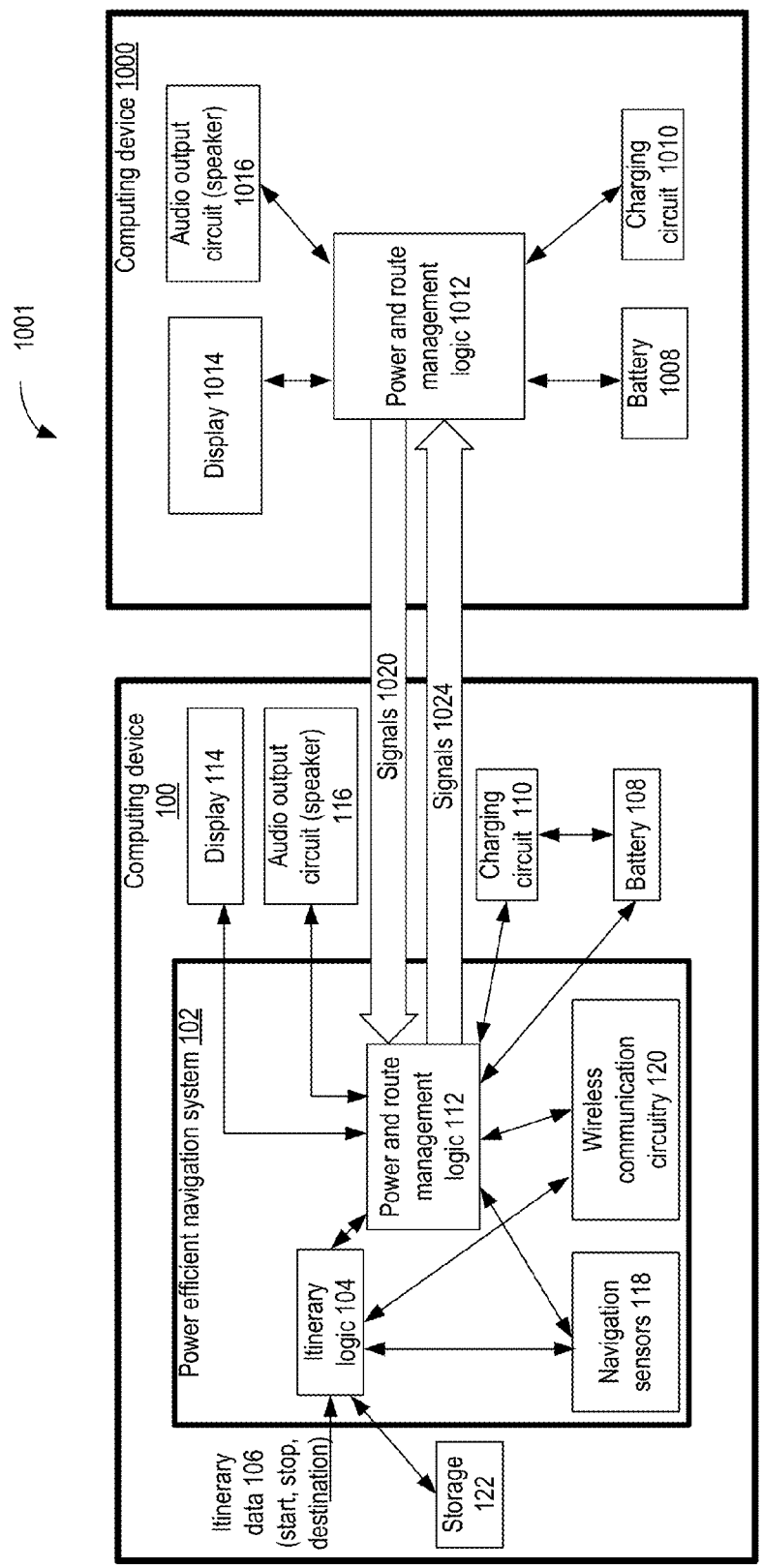
FIG. 10 illustrates a system in which a first device, in combination with a second device, provides navigational directions to a user in a battery power efficient manner, according to some embodiments.

In some embodiments, the device 100 of FIG. 1 can provide navigational directions to the user via the display 114, the speaker 116, and/or another auxiliary device. FIG. 10 illustrates a system 1001 in which the device 100 of FIG. 1, in combination with another computing device 1000 (henceforth also referred to as "device 1000"), provides navigational directions to a user in a battery power efficient manner, according to some embodiments.

In some embodiments, the device 1000 can be an auxiliary device that can provide navigational directions to the user via one or more output interfaces, e.g., via a display 1014 and/or an audio output circuit 1016 (henceforth also referred to as "speaker 1016"). The device 1000, for example, is a wearable device (e.g., positioned on a body of the user), such as a smart watch (e.g., which can display and/or announce navigational directions to the user), a pair of smart glasses (e.g., which can also display and/or announce navigational directions to the user), etc. In another example, the device 1000 can be a smart projector that can project navigational directions on a front windshield of a car, and/or also announce the navigational directions. In yet another example, the device 1000 can be any appropriate consumer electronics device that is capable of receiving navigational directions from the device 100, and outputting the navigational directions to the user.

In some embodiments, the device 1000 comprises the display 1014, the speaker 1016, battery 1008, a charging circuitry 1010, and a power and route management system 1012 (henceforth also referred to as "system 1012"). In some embodiments, the system 1012 receives information from the circuitry 1010 and/or the battery 1008, based on which the system 1012 can estimate a remaining charge level of the battery 1008. In some embodiments, the system 1012 is also configured to estimate a remaining battery time (also referred to as "estimated battery time") if the device 1000 operates in the current mode of operation, and/or if the device 1000 operates in one or more of a plurality of navigation modes of operation.

In some embodiments, the device 1000 transmits signals 1020 to the logic 112 of the device 100, and receives signals 1024 from the logic 112. The signals 1020, for example, comprises information about the battery 1008, estimated remaining battery time of the battery 1008, typical current consumption of the device 1000 in various navigation modes, etc. The signals 1024 comprises, for example, navigational directions to be output by the device 1000.

FIG. 11 illustrates a user interface window 1100 (henceforth also referred to as "window 1100") displaying estimated battery time remaining in the devices 100 and 1000 of FIG. 10, for each of a plurality of navigation modes, according to some embodiments. In FIG. 11 and a subsequent figure (e.g., FIG. 12), it is assumed that the device 100 is a smart phone or a mobile phone, and the device 1000 is a pair of smart glasses—however, these are merely examples used to explain the teachings of this disclosure.

The window 1100 of FIG. 11 is similar to the window 300 of FIG. 3. However, unlike the window 300, the window 1100 illustrates the estimated battery time remaining for the phone 100, as well as for the glasses 1000, for various navigation modes. In some embodiments, the window 1100 is displayed on the display 114 of the device 100 (e.g., by the logic 112), although in some other embodiments, the window 1100 can be additionally, or alternatively, displayed on the display 1014 of the device 1000.

For example, the window 1100 illustrates estimated remaining battery time for both the phone and the glasses for the normal navigation mode. Selecting the normal navigation mode, for example, displays a window (e.g., similar to the window 300a) explaining this mode, although such a window is not illustrated in FIG. 11. In the normal navigation mode, for example, the displays of the phone and the glasses are always on, while these devices provide navigational directions to the user.

Similar to the window 300, the window 1100 also illustrates estimated remaining battery time for both the phone and the glasses for the regular power saving navigation mode. Selecting the regular power saving navigation mode, for example, displays a window (e.g., similar to the window 300b) explaining this mode, although such a window is not illustrated in FIG. 11. In the regular power saving navigation mode, for example, the displays of the phone and the glasses are switched on only during turns and road changes (e.g., similar to FIG. 3), while these devices provide navigational directions to the user.

Similar to the window 300, the window 1100 also illustrates estimated remaining battery time for both the phone and the glasses for the super and ultimate power saving navigation modes. Selecting each of these power saving navigation modes, for example, display a corresponding window (e.g., similar to the windows 300c and 300d) explaining the selected mode, although such windows are not illustrated in FIG. 11. In the super power saving navigation mode, for example, the displays of the phone and the glasses are off, and direction is provided via audio (e.g., similar to FIG. 3), while these devices provide navigational directions to the user. In another example, in the super power saving navigation mode, the displays of the phone and the glasses are always off, and direction is provided via audio only (e.g., similar to FIG. 3), while these devices provided navigational directions to the user. In the ultimate power saving navigation mode, for example, the displays of the phone and the glasses are always off, direction is provided via audio only, and the navigation sensors 118 are intermittently switched off (e.g., similar to FIG. 3), while these devices provide navigational directions to the user. In an example, because the device 1000 may not have any navigation sensors, the ultimate power saving navigation mode may not yield any additional power saving for the device 1000 over the super power saving navigation mode.

Figure 12:
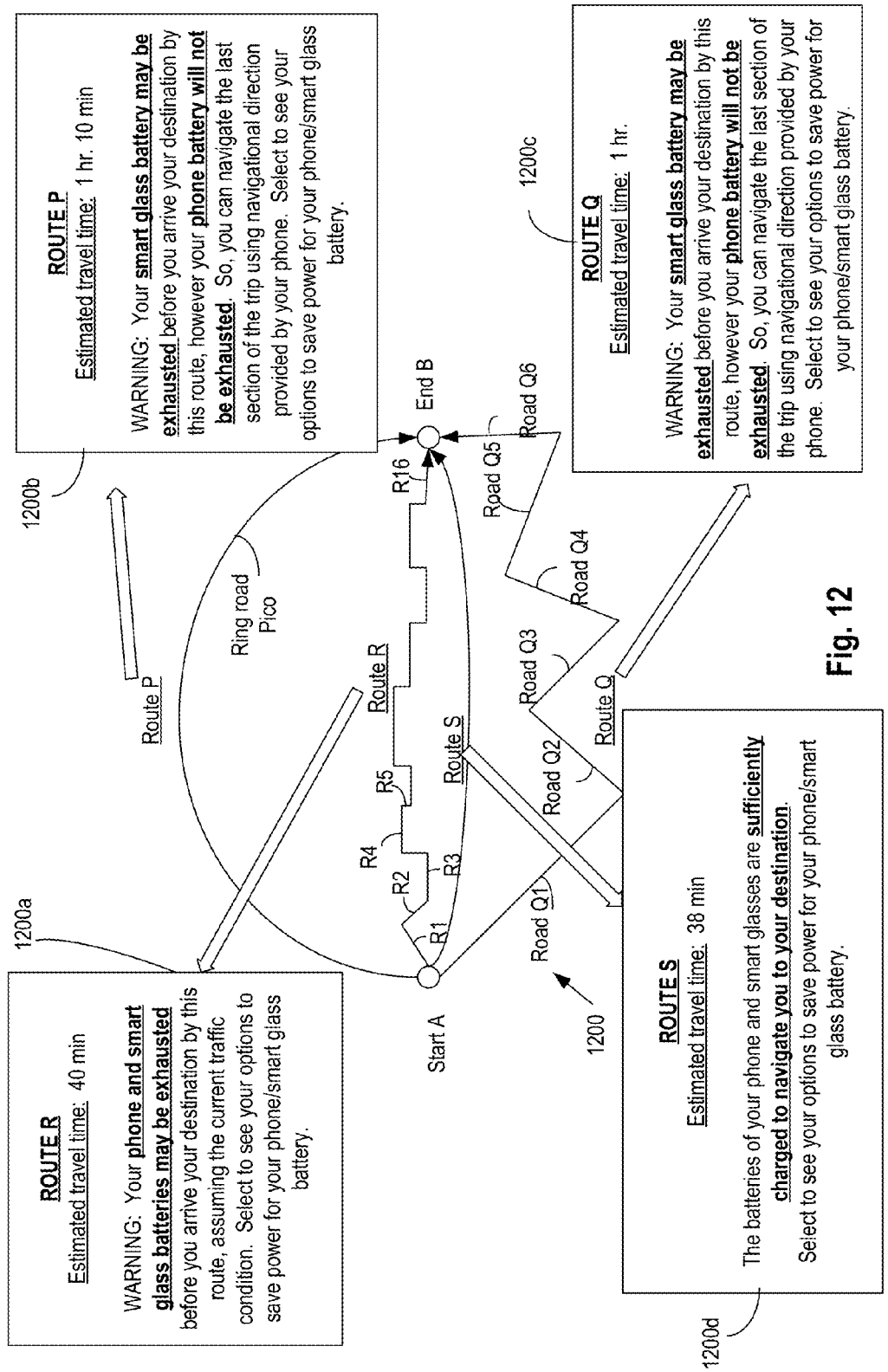
FIG. 12 illustrates a map along with one or more warnings about charges of batteries of a first device and/or a second device being exhausted prior to reaching the destination, according to some embodiments.

FIG. 11 illustrates an example format to display information about remaining battery time for both the devices 100 and 1100. Such information, indications and/or warnings can be delivered in any other appropriate format as well, e.g., as discussed with respect to FIGS. 4-8 (although, for example, these figures have to be appropriately modified to display information about both the devices 100 and 1000, e.g., instead of only the device 100). Merely as an example, FIG. 12 illustrates a map 1200 along with one or more warnings about battery being exhausted prior to reaching the destination, according to some embodiments. The map 1200 has four routes P, Q, R, and S, and each route has a corresponding indication displayed (e.g., indications 1200a, 1200b, 1200c, and 1200d). The indications display a combination of feasible and infeasible routes for the devices 100 and 1000, for a normal navigation mode.

For example, the indication 1200a indicates that the charges of the batteries of the phone (e.g., which is the device 100) and the smart glasses (e.g., which is the device 1000) are estimated to be exhausted before the user reached the destination point B, and provides options to save power for the batteries of the two devices. The indications 1200b, 1200c, and 1200d are self-explanatory, and will be apparent to those skilled in the art, e.g., based at least in part on the discussion with respect to various earlier figures provided herein.

FIGS. 11-12, for example, provide combined warnings about battery charge level for the devices 100 and 1000. However, in some other embodiments (and although not illustrated in the figures), indication about battery level for the device 100 and for the device 1000 can be displayed separately.

FIG. 13 illustrates a computing device 2100, a smart device, a computing device or a computer system or a SoC (System-on-Chip) 2100, which is used to provide battery power efficient navigation services. In some embodiments, the computing device 2100 can be used to implement the device 100 of FIGS. 1 and 10, or the device 1000 of FIG. 10. It is pointed out that those elements of FIG. 13 having the same reference numbers (or names) as the elements of any other figure can operate or function in any manner similar to that described, but are not limited to such.

In some embodiments, computing device 2100 represents an appropriate computing device, such as a computing tablet, a mobile phone or smart-phone, a laptop, a desktop, an IOT device, a server, a set-top box, a wireless-enabled e-reader, or the like. It will be understood that certain components are shown generally, and not all components of such a device are shown in computing device 2100.

In some embodiments, computing device 2100 includes a first processor 2110. The various embodiments of the present disclosure may also comprise a network interface within 2170 such as a wireless interface so that a system embodiment may be incorporated into a wireless device, for example, cell phone or personal digital assistant.

In one embodiment, processor 2110 can include one or more physical devices, such as microprocessors, application processors, microcontrollers, programmable logic devices, or other processing means. The processing operations performed by processor 2110 include the execution of an operating platform or operating system on which applications and/or device functions are executed. The processing operations include operations related to I/O (input/output) with a human user or with other devices, operations related to power management, and/or operations related to connecting the computing device 2100 to another device. The processing operations may also include operations related to audio I/O and/or display I/O.

In one embodiment, computing device 2100 includes audio subsystem 2120, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 2100, or connected to the computing device 2100. In one embodiment, a user interacts with the computing device 2100 by providing audio commands that are received and processed by processor 2110.

Display subsystem 2130 represents hardware (e.g., display devices) and software (e.g., drivers) components that provide a visual and/or tactile display for a user to interact with the computing device 2100. Display subsystem 2130 includes display interface 2132, which includes the particular screen or hardware device used to provide a display to a user. In one embodiment, display interface 2132 includes logic separate from processor 2110 to perform at least some processing related to the display. In one embodiment, display subsystem 2130 includes a touch screen (or touch pad) device that provides both output and input to a user.

I/O controller 2140 represents hardware devices and software components related to interaction with a user. I/O controller 2140 is operable to manage hardware that is part of audio subsystem 2120 and/or display subsystem 2130. Additionally, I/O controller 2140 illustrates a connection point for additional devices that connect to computing device 2100 through which a user might interact with the system. For example, devices that can be attached to the computing device 2100 might include microphone devices, speaker or stereo systems, video systems or other display devices, keyboard or keypad devices, or other I/O devices for use with specific applications such as card readers or other devices.

As mentioned above, I/O controller 2140 can interact with audio subsystem 2120 and/or display subsystem 2130. For example, input through a microphone or other audio device can provide input or commands for one or more applications or functions of the computing device 2100. Additionally, audio output can be provided instead of, or in addition to display output. In another example, if display subsystem 2130 includes a touch screen, the display device also acts as an input device, which can be at least partially managed by I/O controller 2140. There can also be additional buttons or switches on the computing device 2100 to provide I/O functions managed by I/O controller 2140.

In one embodiment, I/O controller 2140 manages devices such as accelerometers, cameras, light sensors or other environmental sensors, or other hardware that can be included in the computing device 2100. The input can be part of direct user interaction, as well as providing environmental input to the system to influence its operations (such as filtering for noise, adjusting displays for brightness detection, applying a flash for a camera, or other features).

In one embodiment, computing device 2100 includes power management 2150 that manages battery power usage, charging of the battery, and features related to power saving operation. Memory subsystem 2160 includes memory devices for storing information in computing device 2100. Memory can include nonvolatile (state does not change if power to the memory device is interrupted) and/or volatile (state is indeterminate if power to the memory device is interrupted) memory devices. Memory subsystem 2160 can store application data, user data, music, photos, documents, or other data, as well as system data (whether long-term or temporary) related to the execution of the applications and functions of the computing device 2100.

Elements of embodiments are also provided as a machine-readable medium (e.g., memory 2160) for storing the computer-executable instructions (e.g., instructions to implement any other processes discussed herein). The machine-readable medium (e.g., memory 2160) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 2170 includes hardware devices (e.g., wireless and/or wired connectors and communication hardware) and software components (e.g., drivers, protocol stacks) to enable the computing device 2100 to communicate with external devices. The computing device 2100 could be separate devices, such as other computing devices, wireless access points or base stations, as well as peripherals such as headsets, printers, or other devices.

Connectivity 2170 can include multiple different types of connectivity. To generalize, the computing device 2100 is illustrated with cellular connectivity 2172 and wireless connectivity 2174. Cellular connectivity 2172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 2174 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 2180 include hardware interfaces and connectors, as well as software components (e.g., drivers, protocol stacks) to make peripheral connections. It will be understood that the computing device 2100 could both be a peripheral device ("to" 2182) to other computing devices, as well as have peripheral devices ("from" 2184) connected to it. The computing device 2100 commonly has a "docking" connector to connect to other computing devices for purposes such as managing (e.g., downloading and/or uploading, changing, synchronizing) content on computing device 2100. Additionally, a docking connector can allow computing device 2100 to connect to certain peripherals that allow the computing device 2100 to control content output, for example, to audiovisual or other systems.

In addition to a proprietary docking connector or other proprietary connection hardware, the computing device 2100 can make peripheral connections 2180 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, at least a part of the audio subsystem 2120 represents the speaker 116 and/or the speaker 1016 of FIGS. 1 and 10. In some embodiments, at least a part of the display subsystem 2130 represents the display 114 and/or display 1014 of FIGS. 1 and 10.

In some embodiments, the computing device 2100 can be used to implement the device 100 of FIGS. 1 and 10, or the device 1000 of FIG. 10. If, for example, the computing device 2100 is used to implement the device 100, then the computing device 2100 comprises the system 102 (and may also include navigation sensors, not illustrated in the figure). If, for example, the computing device 2100 is used to implement the device 1000, then the computing device 2100 comprises the system 1012. The systems 102 or 1012 provide navigational directions to a user of the device 1200 in a power efficient manner, e.g., taking into account a battery charge level of the computing device 2100, e.g., as discussed throughout this disclosure.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following example clauses pertain to further embodiments. Specifics in the example clauses may be used anywhere in one or more embodiments. All optional features of the apparatus described herein may also be implemented with respect to a method or process.

Clause 1. An apparatus comprising: a first circuitry to (i) receive an identification of a start location and an identification of an end location, (ii) generate a first route to reach the end location from the start location, and (iii) estimate a first travel time to travel from the start location to the end location via the first route, wherein a battery is to power the apparatus when an external power source is unavailable; and a second circuitry to (i) determine that a first estimated battery remaining time, if the apparatus is to operate in a first mode of operation and is to travel via the first route, is lower than the first travel time, and (ii) issue a warning to indicate that battery power is likely to be exhausted prior to a user is to reach the end location via the first route, if the apparatus is to operate in the first mode of operation.

Clause 2. The apparatus of clause 1, wherein: the first circuitry is to (i) generate a second route to reach the end location from the start location, and (ii) estimate a second travel time to travel from the start location to the end location via the second route; and the second circuitry is to (i) determine that a second estimated battery remaining time, if the apparatus is to operate in the first mode of operation and is to travel via the second route, is higher than the second travel time, and (ii) issue an indication that the battery is likely to be able to power the apparatus until the user is to reach the end location via the second route, if the apparatus is to operate in the first mode of operation.

Clause 3. The apparatus of clause 1, wherein: the second circuitry is to (i) determine that a second estimated battery remaining time, if the apparatus is to operate in a second mode of operation and is to travel via the first route, is higher than the first travel time, and (ii) issue an indication that the battery is likely to be able to power the apparatus until the user is to reach the end location via the first route, if the apparatus is to operate in the second mode of operation.

Clause 4. The apparatus of clause 3, further comprising: a display to display information associated with the first mode of operation and the second mode of operation.

Clause 5. The apparatus of any of clauses 3-4, wherein the first mode is a normal navigation mode, and the second mode is a power saving navigation mode.

Clause 6. The apparatus of any of clauses 3-5, wherein during the second mode of operation, a display of the apparatus is in a low power state for at least a part of a travel of the apparatus from the start location to the end location.

Clause 7. The apparatus of any of clauses 3-6, wherein during the second mode of operation, one or more navigation sensors of the apparatus is in a low power state for at least a part of a travel of the apparatus from the start location to the end location.

Clause 8. The apparatus of any of clauses 3-7, further comprising: a third circuitry to display an option that is to allow a selection of the first mode of operation or the second mode of operation as a default mode of operation for the apparatus, while the apparatus is to output navigational direction.

Clause 9. The apparatus of any of clauses 1-6, further comprising: one or more navigational sensors to detect signals emitted from one or more satellites, and facilitate estimating a geo-location of the apparatus.

Clause 10. The apparatus of any of clauses 1-9, wherein the apparatus is a mobile device.

Clause 11. The apparatus of any of clauses 1-10, wherein: the apparatus is a first apparatus; the battery is a first battery; the apparatus is to be coupled to a second apparatus that includes a second battery; and the second circuitry is to: determine that a second estimated battery remaining time of the second battery, if the second apparatus is to operate in the first mode of operation and is to travel via the first route, is lower than the first travel time, and issue a warning which is to indicate that battery power of the second battery is likely to be exhausted prior to the user reaching the end location via the first route, if the second apparatus is to operate in the first mode of operation.

Clause 12. An apparatus comprising: a battery to selectively power the apparatus; a first circuitry to estimate a first travel time to travel from a start location to an end location via a first route; and a second circuitry to (i) determine that a charge of the battery is likely to be exhausted prior to a user is to reach the end location via the first route, if the apparatus is to operate in a first mode of operation, and (ii) display the first route as an infeasible route.

Clause 13. The apparatus of clause 12, wherein: the first circuitry is to estimate a second travel time to travel from the start location to the end location via a second route; and the second circuitry is to (i) determine that the charge of the battery is likely to last until the user is to reach the end location via the second route, if the apparatus is to operate in the first mode of operation, and (ii) display the second route as a feasible route.

Clause 14. The apparatus of clause 12, wherein: the second circuitry is to (i) determine that the charge of the battery is likely to last until the user is to reach the end location via the first route, if the apparatus is to operate in a second mode of operation, and (ii) display the first route as a feasible route if the apparatus is to operate in the second mode.

Clause 15. A system comprising: a battery to power the system when an external power source is unavailable; a memory to store a database of maps; a processor coupled to the memory; first logic to (i) receive an identification of a start location and an identification of a destination, and (ii) based at least in part on the database of maps, generate a first route for to reach the destination from the start location; and second logic to (i) determine that the battery is likely to be exhausted before a user of the system navigates to the destination via the first route, if the apparatus is to operate in a first mode of operation, and (ii) issue a warning to indicate that the battery is likely to be exhausted before the user is to navigate to the destination via the first route, if the apparatus is to operate in the first mode of operation Clause 16. The system of clause 15, wherein: the first logic is to, based at least in part of the database of maps, generate a second route to reach the destination from the start location; and the second logic to (i) determine that the battery is likely to be able to power the system until at least the user of the system is to navigate to the destination via the second route, if the apparatus is to operate in the first mode of operation, and (ii) issue an indication to indicate that the battery is likely to be able to power the system until at least the user of the system is to navigate to the destination via the second route, if the apparatus is to operate in a first mode of operation.

Clause 17. The system of clause 15, wherein the first mode of operation is a regular navigation mode of operation, and wherein: the second logic is to (i) determine that the battery is likely to be able to power the system until at least the user is to navigate to the destination via the first route, if the apparatus is to operate in a power saving navigation mode of operation, and (ii) issue an indication to indicate that the battery is likely to be able to power the system until at least the user is to navigate to the destination via the first route, if the apparatus is to operate in the power saving navigation mode of operation.

Clause 18. The system of clause 17, further comprising: a display to display information associated with the first mode of operation and the second mode of operation.

Clause 19. The system of any of clauses 15-18, further comprising: one or more navigational sensors to (i) detect signals emitted from one or more satellites, and (ii) facilitate estimating a geo-location of the system.

Clause 20. The system of any of clauses 15-19, wherein the system is a mobile device.

Clause 21. One or more non-transitory computer-readable storage media to store instructions that, when executed by a processor, cause the processor to: receive an identification of a start location and an identification of an end location; generate a first route to reach the end location from the start location; estimate a first travel time to travel from the start location to the end location via the first route, wherein a battery is included in an apparatus comprising the storage media and the processor, and wherein the battery is to power the apparatus when an external power source is not available; determine that a first estimated battery remaining time, while the apparatus is to operate in a first mode of operation, is lower than the first travel time; and issue a warning to indicate that battery power is likely to be exhausted prior to a user is to reach the end location via the first route, if the apparatus is to operate in the first mode of operation.

Clause 22. The one or more non-transitory computer-readable storage media of clause 21, wherein the instructions, when executed, further cause the processor to: generate a second route to reach the end location from the start location; estimate a second travel time to travel from the start location to the end location via the second route; determine that a second estimated battery remaining time, if the apparatus is to operate in the first mode of operation and travels via the second route, is higher than the second travel time; and issue an indication that the battery is likely to be able to power the apparatus until the user is to reach the end location via the second route, if the apparatus is to operate in the first mode of operation Clause 23. The one or more non-transitory computer-readable storage media of clause 21, wherein the instructions, when executed, cause the processor to: determine that a second estimated battery remaining time, if the apparatus is to operate in a second mode of operation and travels via the first route, is higher than the first travel time; and issue an indication that the battery is likely to be able to power the apparatus until the user is to reach the end location via the first route, if the apparatus is to operate in the second mode of operation.

Clause 24. A method comprising: receiving an identification of a start location and an identification of an end location; generating a first route to reach the end location from the start location; estimating a first travel time to travel from the start location to the end location via the first route, wherein a battery is to power an apparatus when an external power source is not available; determining that a first estimated battery remaining time, while the apparatus is to operate in a first mode of operation, is lower than the first travel time; and issuing a warning to indicate that battery power is likely to be exhausted prior to a user is to reach the end location via the first route, if the apparatus is to operate in the first mode of operation.

Clause 25. The method of clause 24, further comprising: generating a second route to reach the end location from the start location; estimating a second travel time to travel from the start location to the end location via the second route; determining that a second estimated battery remaining time, if the apparatus is to operate in the first mode of operation and travels via the second route, is higher than the second travel time; and issuing an indication that the battery is likely to be able to power the apparatus until the user is to reach the end location via the second route, if the apparatus is to operate in the first mode of operation Clause 26. The method of clause 24, further comprising: determining that a second estimated battery remaining time, if the apparatus is to operate in a second mode of operation and travels via the first route, is higher than the first travel time; and issuing an indication that the battery is likely to be able to power the apparatus until the user is to reach the end location via the first route, if the apparatus is to operate in the second mode of operation.

Clause 27. One or more non-transitory computer-readable storage media to store instructions that, when executed by a processor, cause the processor to perform a method of any of clauses 24-26.

Clause 28. An apparatus comprising means for performing a method of any of clauses 24-26.

Clause 29. An apparatus comprising: means for receiving an identification of a start location and an identification of an end location; means for generating a first route to reach the end location from the start location; means for estimating a first travel time to travel from the start location to the end location via the first route, wherein a battery is to power the apparatus when an external power source is not available; means for determining that a first estimated battery remaining time, while the apparatus is to operate in a first mode of operation, is lower than the first travel time; and means for issuing a warning to indicate that battery power is likely to be exhausted prior to a user is to reach the end location via the first route, if the apparatus is to operate in the first mode of operation.

Clause 30. The apparatus of clause 29, further comprising: means for generating a second route to reach the end location from the start location; means for estimating a second travel time to travel from the start location to the end location via the second route; means for determining that a second estimated battery remaining time, if the apparatus is to operate in the first mode of operation and travels via the second route, is higher than the second travel time; and means for issuing an indication that the battery is likely to be able to power the apparatus until the user is to reach the end location via the second route, if the apparatus is to operate in the first mode of operation Clause 31. The apparatus of clause 29, further comprising: means for determining that a second estimated battery remaining time, if the apparatus is to operate in a second mode of operation and travels via the first route, is higher than the first travel time; and means for issuing an indication that the battery is likely to be able to power the apparatus until the user is to reach the end location via the first route, if the apparatus is to operate in the second mode of operation.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
a first circuitry to (i) receive an identification of a start location and an identification of an end location, (ii) generate a first route to reach the end location from the start location, and (iii) estimate a first travel time to travel from the start location to the end location via the first route, wherein a battery is to power the apparatus when an external power source is unavailable; and
a second circuitry to (i) determine that a first estimated battery remaining time, if the apparatus is to operate in a first mode of operation and is to travel via the first route, is lower than the first travel time, and (ii) issue a warning to indicate that battery power is likely to be exhausted prior to a user is to reach the end location via the first route, if the apparatus is to operate in the first mode of operation.

2. The apparatus of claim 1, wherein:
the first circuitry is to (i) generate a second route to reach the end location from the start location, and (ii) estimate a second travel time to travel from the start location to the end location via the second route; and
the second circuitry is to (i) determine that a second estimated battery remaining time, if the apparatus is to operate in the first mode of operation and is to travel via the second route, is higher than the second travel time, and (ii) issue an indication that the battery is likely to be able to power the apparatus until the user is to reach the end location via the second route, if the apparatus is to operate in the first mode of operation.

3. The apparatus of claim 1, wherein:
the second circuitry is to (i) determine that a second estimated battery remaining time, if the apparatus is to operate in a second mode of operation and is to travel via the first route, is higher than the first travel time, and (ii) issue an indication that the battery is likely to be able to power the apparatus until the user is to reach the end location via the first route, if the apparatus is to operate in the second mode of operation.

4. The apparatus of claim 3, further comprising:
a display to display information associated with the first mode of operation and the second mode of operation.

5. The apparatus of claim 3, wherein the first mode is a normal navigation mode, and the second mode is a power saving navigation mode.

6. The apparatus of claim 3, wherein during the second mode of operation, a display of the apparatus is in a low power state for at least a part of a travel of the apparatus from the start location to the end location.

7. The apparatus of claim 3, wherein during the second mode of operation, one or more navigation sensors of the apparatus is in a low power state for at least a part of a travel of the apparatus from the start location to the end location.

8. The apparatus of claim 3, further comprising:
a third circuitry to display an option that is to allow a selection of the first mode of operation or the second mode of operation as a default mode of operation for the apparatus, while the apparatus is to output navigational direction.

9. The apparatus of claim 1, further comprising:
one or more navigational sensors to detect signals emitted from one or more satellites, and facilitate estimating a geo-location of the apparatus.

10. The apparatus of claim 1, wherein the apparatus is a mobile device.

11. The apparatus of claim 1, wherein:
the apparatus is a first apparatus;
the battery is a first battery;
the apparatus is to be coupled to a second apparatus that includes a second battery; and
the second circuitry is to:
determine that a second estimated battery remaining time of the second battery, if the second apparatus is to operate in the first mode of operation and is to travel via the first route, is lower than the first travel time, and
issue a warning which is to indicate that battery power of the second battery is likely to be exhausted prior to the user reaching the end location via the first route, if the second apparatus is to operate in the first mode of operation.

12. An apparatus comprising:
a battery to selectively power the apparatus;
a first circuitry to estimate a first travel time to travel from a start location to an end location via a first route; and
a second circuitry to (i) determine that a charge of the battery is likely to be exhausted prior to a user is to reach the end location via the first route, if the apparatus is to operate in a first mode of operation, and (ii) display the first route as an infeasible route, in response to determining that the charge of the battery is likely to be exhausted prior to the user is to reach the end location via the first route,
wherein the first circuitry is to estimate a second travel time to travel from the start location to the end location via a second route; and
wherein the second circuitry is to (i) determine that the charge of the battery is likely to last until the user is to reach the end location via the second route, if the apparatus is to operate in the first mode of operation, and (ii) display the second route as a feasible route.

13. An apparatus comprising:
a battery to selectively power the apparatus;
a first circuitry to estimate a first travel time to travel from a start location to an end location via a first route; and a second circuitry to (i) determine that a charge of the
battery is likely to be exhausted prior to a user is to
reach the end location via the first route, if the apparatus is to operate in a first mode of operation, and (ii)
display the first route as an infeasible route, in response
to determining that the charge of the battery is likely to
be exhausted prior to the user is to reach the end
location via the first route, wherein the second circuitry is to (i) determine that the
charge of the battery is likely to last until the user is to
reach the end location via the first route, if the apparatus is to operate in a second mode of operation, and
(ii) display the first route as a feasible route if the
apparatus is to operate in the second mode.

14. A system comprising:
a battery to power the system when an external power source is unavailable;
a memory to store a database of maps;
a processor coupled to the memory;
first logic to (i) receive an identification of a start location and an identification of a destination, and (ii) based at least in part on the database of maps, generate a first route for to reach the destination from the start location; and
second logic to (i) determine that the battery is likely to be exhausted before a user of the system navigates to the destination via the first route, if the apparatus is to operate in a first mode of operation, and (ii) issue a warning to indicate that the battery is likely to be exhausted before the user is to navigate to the destination via the first route, if the apparatus is to operate in the first mode of operation.

15. The system of claim 14, wherein:
the first logic is to, based at least in part of the database of maps, generate a second route to reach the destination from the start location; and
the second logic to (i) determine that the battery is likely to be able to power the system until at least the user of the system is to navigate to the destination via the second route, if the apparatus is to operate in the first mode of operation, and (ii) issue an indication to indicate that the battery is likely to be able to power the system until at least the user of the system is to navigate to the destination via the second route, if the apparatus is to operate in a first mode of operation.

16. The system of claim 14, wherein the first mode of operation is a regular navigation mode of operation, and wherein:
the second logic is to (i) determine that the battery is likely to be able to power the system until at least the user is to navigate to the destination via the first route, if the apparatus is to operate in a power saving navigation mode of operation, and (ii) issue an indication to indicate that the battery is likely to be able to power the system until at least the user is to navigate to the destination via the first route, if the apparatus is to operate in the power saving navigation mode of operation.

17. The system of claim 16, further comprising:
a display to display information associated with the first mode of operation and the second mode of operation.

18. The system of claim 14, further comprising:
one or more navigational sensors to (i) detect signals emitted from one or more satellites, and (ii) facilitate estimating a geo-location of the system.

19. The system of claim 14, wherein the system is a mobile device.

20. One or more non-transitory computer-readable storage media to store instructions that, when executed by a processor, cause the processor to:
receive an identification of a start location and an identification of an end location;
generate a first route to reach the end location from the start location;
estimate a first travel time to travel from the start location to the end location via the first route, wherein a battery is included in an apparatus comprising the storage media and the processor, and wherein the battery is to power the apparatus when an external power source is not available;
determine that a first estimated battery remaining time, while the apparatus is to operate in a first mode of operation, is lower than the first travel time; and
issue a warning to indicate that battery power is likely to be exhausted prior to a user is to reach the end location via the first route, if the apparatus is to operate in the first mode of operation.

21. The one or more non-transitory computer-readable storage media of claim 20, wherein the instructions, when executed, further cause the processor to:
generate a second route to reach the end location from the start location;
estimate a second travel time to travel from the start location to the end location via the second route;
determine that a second estimated battery remaining time, if the apparatus is to operate in the first mode of operation and travels via the second route, is higher than the second travel time; and
issue an indication that the battery is likely to be able to power the apparatus until the user is to reach the end location via the second route, if the apparatus is to operate in the first mode of operation.

22. The one or more non-transitory computer-readable storage media of claim 20, wherein the instructions, when executed, cause the processor to:
determine that a second estimated battery remaining time, if the apparatus is to operate in a second mode of operation and travels via the first route, is higher than the first travel time; and
issue an indication that the battery is likely to be able to power the apparatus until the user is to reach the end location via the first route, if the apparatus is to operate in the second mode of operation.

23. One or more non-transitory computer-readable storage media to store instructions that, when executed by a processor, cause the processor to perform an operation comprising:
determine a first route to travel from a start location to an end location, wherein the processor is to be charged by a battery;
determine that a charge of the battery is likely to be exhausted prior to a user is to reach the end location via the first route;
indicate the first route as being an infeasible route, in response to determining that the charge of the battery is likely to be exhausted prior to the user is to reach the end location via the first route;
determine a second route to travel from the start location to the end location;
determine that the charge of the battery is likely to last until the user is to reach the end location via the second route; and
indicate the second route as being a feasible route.

* * * * *